(12) United States Patent
Longacre et al.

(10) Patent No.: US 10,215,087 B2
(45) Date of Patent: Feb. 26, 2019

(54) CORROSION RESISTANT PNEUMATIC ACTUATOR

(71) Applicant: BorgWarner Inc., Auburn Hills, MI (US)

(72) Inventors: Christian Longacre, Arden, NC (US); Ryan Howell, Hendersonville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 222 days.

(21) Appl. No.: 15/116,560

(22) PCT Filed: Feb. 5, 2015

(86) PCT No.: PCT/US2015/014540
§ 371 (c)(1),
(2) Date: Aug. 4, 2016

(87) PCT Pub. No.: WO2015/123075
PCT Pub. Date: Aug. 20, 2015

(65) Prior Publication Data
US 2016/0356208 A1 Dec. 8, 2016

Related U.S. Application Data

(60) Provisional application No. 61/938,284, filed on Feb. 11, 2014.

(51) Int. Cl.
*F02B 33/44* (2006.01)
*F16K 15/00* (2006.01)
(Continued)

(52) U.S. Cl.
CPC .............. *F02B 37/186* (2013.01); *F01D 5/04* (2013.01); *F01D 17/105* (2013.01);
(Continued)

(58) Field of Classification Search
CPC ...... F02B 37/186; F02B 37/18; F02B 37/183; F02B 39/16; F01D 5/04; F01D 17/105;
(Continued)

(56) References Cited

U.S. PATENT DOCUMENTS 2,537,308 A * 1/1951 Hansen ................. F16K 31/404
92/99
3,079,898 A * 3/1963 Jensen ...................... F15B 9/08
92/28
(Continued)

FOREIGN PATENT DOCUMENTS

| CN | 102227549 A | 10/2011 |
|---|---|---|
| DE | 4244573 A1 | 7/1994 |

(Continued)

OTHER PUBLICATIONS

An English machine translation of the reference to Hoffmann et al. (Pub. No. DE 42 44 573 A1), published on Jul. 7, 1994.*
(Continued)

*Primary Examiner* — Thai Ba Trieu
(74) *Attorney, Agent, or Firm* — BrooksGroup

(57) ABSTRACT

A turbocharger (1) includes a wastegate valve (30) supported on the turbine housing (8), and a pneumatic actuator (100) configured to actuate the wastegate valve (30). The pneumatic actuator (100) includes a housing (101) separated into compartments (104, 108) by a separating member (110, 112). The actuator (100) includes a piston (112) disposed in the housing (101) that defines at least a portion of the separating member (110, 112), a piston-biasing spring (120) disposed in the housing (101), a first inlet (126) that is in fluid communication with the first compartment (104), the first inlet configured to be connected to a non-zero-pressure fluid source (8), and a second inlet (116) that is in fluid communication with the second compartment (108), the
(Continued)

second inlet (116) configured to be connected to a non-zero-pressure fluid source (104).

8 Claims, 8 Drawing Sheets

(51) Int. Cl.
| | |
|---|---|
| F15B 15/26 | (2006.01) |
| F15B 21/04 | (2006.01) |
| F02B 37/18 | (2006.01) |
| F02B 39/16 | (2006.01) |
| F01D 5/04 | (2006.01) |
| F01D 17/10 | (2006.01) |
| F01D 17/14 | (2006.01) |
| F01D 25/24 | (2006.01) |
| F04D 25/04 | (2006.01) |
| F04D 29/28 | (2006.01) |
| F15B 15/02 | (2006.01) |
| F15B 15/10 | (2006.01) |
| F15B 21/041 | (2019.01) |

(52) U.S. Cl.
CPC ........... *F01D 17/145* (2013.01); *F01D 25/24* (2013.01); *F02B 39/16* (2013.01); *F04D 25/045* (2013.01); *F04D 29/284* (2013.01); *F15B 15/02* (2013.01); *F15B 15/10* (2013.01); *F05D 2220/40* (2013.01); *F15B 21/041* (2013.01); *Y02T 10/144* (2013.01)

(58) Field of Classification Search
CPC .... F01D 17/145; F04D 25/045; F04D 29/284; F15B 15/02; F15B 15/10; F15B 21/041; F05D 2220/40; Y02T 10/144
USPC ....... 60/602; 92/62, 63, 65, 94, 28, 99, 128; 251/61.2, 61.4, 331, 279, 61
See application file for complete search history.

(56) References Cited

U.S. PATENT DOCUMENTS

| | | | | |
|---|---|---|---|---|
| 3,195,805 | A * | 7/1965 | Cholvin | F02B 37/186 60/602 |
| 3,257,796 | A * | 6/1966 | Updike | F02B 37/183 60/602 |
| 3,335,805 | A * | 8/1967 | Diez | B22D 31/00 91/461 |
| 3,886,968 | A | 6/1975 | Murrell | |
| 4,248,047 | A * | 2/1981 | Sumi | F02B 37/186 60/602 |
| 4,271,672 | A * | 6/1981 | Withalm | F02B 37/186 60/602 |
| 4,403,538 | A * | 9/1983 | Rise | F02B 37/186 60/602 |
| 4,404,804 | A * | 9/1983 | Tadokoro | F02B 37/18 60/602 |
| 4,424,675 | A * | 1/1984 | Ojima | F02B 37/186 60/602 |
| 4,642,991 | A * | 2/1987 | Kawabata | F02B 37/186 60/602 |
| 4,763,474 | A | 8/1988 | Franklin | |
| 5,224,853 | A * | 7/1993 | Kazuo | F02B 37/18 60/602 |
| 5,460,076 | A | 10/1995 | Pierce et al. | |
| 5,471,022 | A * | 11/1995 | Kiss | H01H 35/34 92/99 |
| 5,709,246 | A | 1/1998 | Koelzer | |
| 6,050,541 | A * | 4/2000 | Chatufale | F15B 15/1471 92/128 |
| 7,044,444 | B2 * | 5/2006 | Haubold | F15B 15/10 251/279 |
| 7,306,195 | B2 * | 12/2007 | Plevich | F15B 15/10 251/61 |
| 8,499,555 | B2 * | 8/2013 | Wolk | F02B 37/18 60/602 |
| 8,794,589 | B2 * | 8/2014 | Arnold | F16K 31/1225 92/62 |
| 8,978,839 | B2 * | 3/2015 | Bradford | B60T 17/083 188/106 F |
| 2004/0112051 | A1 | 6/2004 | Riley et al. | |
| 2011/0225968 | A1 | 9/2011 | Eiraku | |
| 2012/0037238 | A1 * | 2/2012 | Studer | B21J 7/40 137/14 |
| 2013/0119289 | A1 * | 5/2013 | Morris | F16K 7/17 251/331 |
| 2014/0014859 | A1 * | 1/2014 | McCarty | F16K 27/08 251/61.4 |
| 2016/0311421 | A1 * | 10/2016 | Spath | B60T 17/083 |

FOREIGN PATENT DOCUMENTS

| | | |
|---|---|---|
| DE | 1953593 A1 | 5/1997 |
| DE | 19935629 A1 | 2/2001 |
| GB | 2033007 A | 5/1980 |
| JP | S62121830 A | 6/1987 |
| JP | H0270922 A | 3/1990 |

OTHER PUBLICATIONS

An English machine translation of the reference to Pohl Wolfgang (Pub. No. de 195 43 593 A1), published on May 28, 1997.*
An English machine translation of the reference to Pohl Wolfgang (Pub. No. de 199 35 629 A1), published on Feb. 1, 2001.*
Extended European Search Report dated Jul. 12, 2017 ; Application No. EP 15 74 9295 ; Applicant: BorgWarner Inc. ;10 pages.
International Search Report and Written Opinion; dated May 14, 2015 ; for International Application No. PCT/US2015/014540; 13 pages.
Chinese Office Action dated May 4, 2018 ; Application No. 201580006930.0; Applicant: BorgWarner Inc.; 21 pages.
European Office Action dated Mar. 15, 2018 ; Application No. 15 749 295.0-1004; Applicant: BorgWarner Inc.; 4 pages.

* cited by examiner

CORROSION RESISTANT PNEUMATIC ACTUATOR

CROSS-REFERENCE TO RELATED APPLICATION

This application claims priority to and all the benefits of U.S. Provisional Application No. 61/938,284, filed on Feb. 11, 2014, and entitled "Corrosion Resistant Pneumatic Actuator," which is incorporated herein by reference.

BACKGROUND

1. Field of the Invention

This invention relates to a pneumatic actuator that uses a flow of air to prevent air and water from entering the pneumatic actuator and to drive water and debris out of the actuator, whereby actuator corrosion and abrasion are reduced.

2. Description of Related Art

A turbocharger is a type of forced induction system used with internal combustion engines. Turbochargers deliver compressed air to an engine intake, allowing more fuel to be combusted, thus boosting an engine's horsepower without significantly increasing engine weight. Thus, turbochargers permit the use of smaller engines that develop the same amount of horsepower as larger, naturally aspirated engines. Using a smaller engine in a vehicle has the desirable effect of decreasing the mass of the vehicle, increasing performance, and enhancing fuel economy. Moreover, the use of turbochargers permits more complete combustion of the fuel delivered to the engine, which contributes to the highly desirable goal of a cleaner environment.

SUMMARY

In some aspects, a single-acting pneumatic actuator includes a housing having a first portion, a first compartment that is defined in part by the first portion, a second portion, and a second compartment that is defined in part by the second portion and is separated from the first compartment by a separating member. The pneumatic actuator includes a piston disposed in the housing, the piston defining at least a portion of the separating member. The pneumatic actuator includes a spring disposed in the housing and extending between the piston and one of the first portion and the second portion. In addition, the pneumatic actuator includes a first inlet that is in fluid communication with the first compartment, the first inlet configured to be connected to a non-zero-pressure fluid source, and a second inlet that is in fluid communication with the second compartment, the second inlet configured to be connected to a non-zero-pressure fluid source.

The pneumatic actuator may include one or more of the following features: The second inlet comprises an orifice in the separating member. The second inlet comprises an opening in the second portion of the housing. The second inlet is connected to the first inlet via a fluid line. The second inlet includes a flow restrictor. A valve is disposed in a fluid path between the first inlet and the housing, and the valve controls fluid flow through the second inlet. The valve is a solenoid-operated valve that is configured to control flow of non-zero-pressure fluid from the non-zero-pressure fluid source to the first compartment. The pneumatic actuator further includes the non-zero-pressure fluid source connected to the first inlet, wherein the non-zero-pressure fluid source is configured to provide fluid at a pressure greater than atmospheric pressure. The pneumatic actuator further includes the non-zero-pressure fluid source connected to the first inlet, wherein the non-zero-pressure fluid source is configured to provide fluid at a pressure less than atmospheric pressure. The separating member includes a diaphragm that is connected to the piston, and the second inlet comprises a first opening in the diaphragm and a second opening in the piston. The separating member includes a diaphragm that is connected to the piston, and the second inlet is an opening in the second portion of the housing at a location spaced apart from the diaphragm. The separating member includes an O-ring disposed about a circumference of the piston and providing a seal between the outer surface of the piston and an inner surface of the housing, and the second inlet comprises an orifice in the piston. The separating member includes a diaphragm that is connected to the piston, and the second inlet comprises a single orifice in the diaphragm having a diameter between 0.25 mm and 2.0 mm and a single orifice in the piston having a diameter between 0.25 mm and 2.0 mm. The separating member includes a diaphragm that is connected to the piston, and the second inlet comprises diaphragm orifices and piston orifices, and the total opening area of the orifices is in a range of 0.049 $mm^2$ to 3.154 $mm^2$. The spring is disposed in the second compartment, and the pressure of the fluid supplied to the first compartment is greater than the pressure of the fluid supplied to the second compartment.

In some aspects, a turbocharger includes a compressor section including a compressor wheel, and a turbine section including a turbine housing that surrounds a turbine wheel, where the turbine wheel is connected to the compressor wheel via a shaft. The turbocharger includes a wastegate valve supported on the turbine housing, and a single-acting pneumatic actuator configured to actuate the wastegate valve. The pneumatic actuator includes a housing having a first portion, a first compartment that is defined in part by the first portion, a second portion, and a second compartment that is defined in part by the second portion and is separated from the first compartment by a separating member. The pneumatic actuator includes a piston disposed in the housing and connected to the wastegate, the piston defining at least a portion of the separating member. The pneumatic actuator includes a spring disposed in the housing and extending between the piston and one of the first portion and the second portion. The pneumatic actuator also includes a first inlet that is in fluid communication with the first compartment, the first inlet configured to be connected to a non-zero-pressure fluid source, and a second inlet that is in fluid communication with the second compartment, the second inlet configured to be connected to a non-zero-pressure fluid source.

A single-acting pneumatic actuator includes a housing separated into a first compartment and a second compartment by a piston. A biasing spring is disposed in the housing and extends between the piston and an inner surface of the housing. The first compartment includes a first inlet that is configured to be connected to a source of non-zero pressure fluid, and the second compartment includes a second inlet that is configured to be connected to a source of non-zero pressure fluid. The pressurized fluid in the first compartment has a pressure sufficient to overcome the biasing force of the spring and move the piston relative to the housing. The fluid in the second compartment is at a relatively low pressure relative to the absolute pressure of the fluid in the first compartment, and serves to lessen the amount of water and debris which enter the second compartment from the environment.

The single-acting pneumatic actuator can be compared to some conventional single-acting pneumatic actuators that provide a non-zero pressure to only the first compartment of the actuator. In such conventional pneumatic actuators, air from the atmosphere is drawn into the second compartment when the piston is refracted into the actuator. In these conventional devices, as air enters the second compartment, water and debris may also enter into the second compartment. The water and debris can interfere with the operation of the piston, and can lead to corrosion and abrasion. Advantageously, by providing the pneumatic actuator with a positive pressure in the second compartment, air flow into the second compartment is reduced or eliminated, whereby corrosion and abrasion are reduced.

BRIEF DESCRIPTION OF THE DRAWINGS

Advantages of the pneumatic actuator will be readily appreciated as the same becomes better understood by reference to the following detailed description when considered in connection with the accompanying drawings wherein.

DETAILED DESCRIPTION

Figure 1:
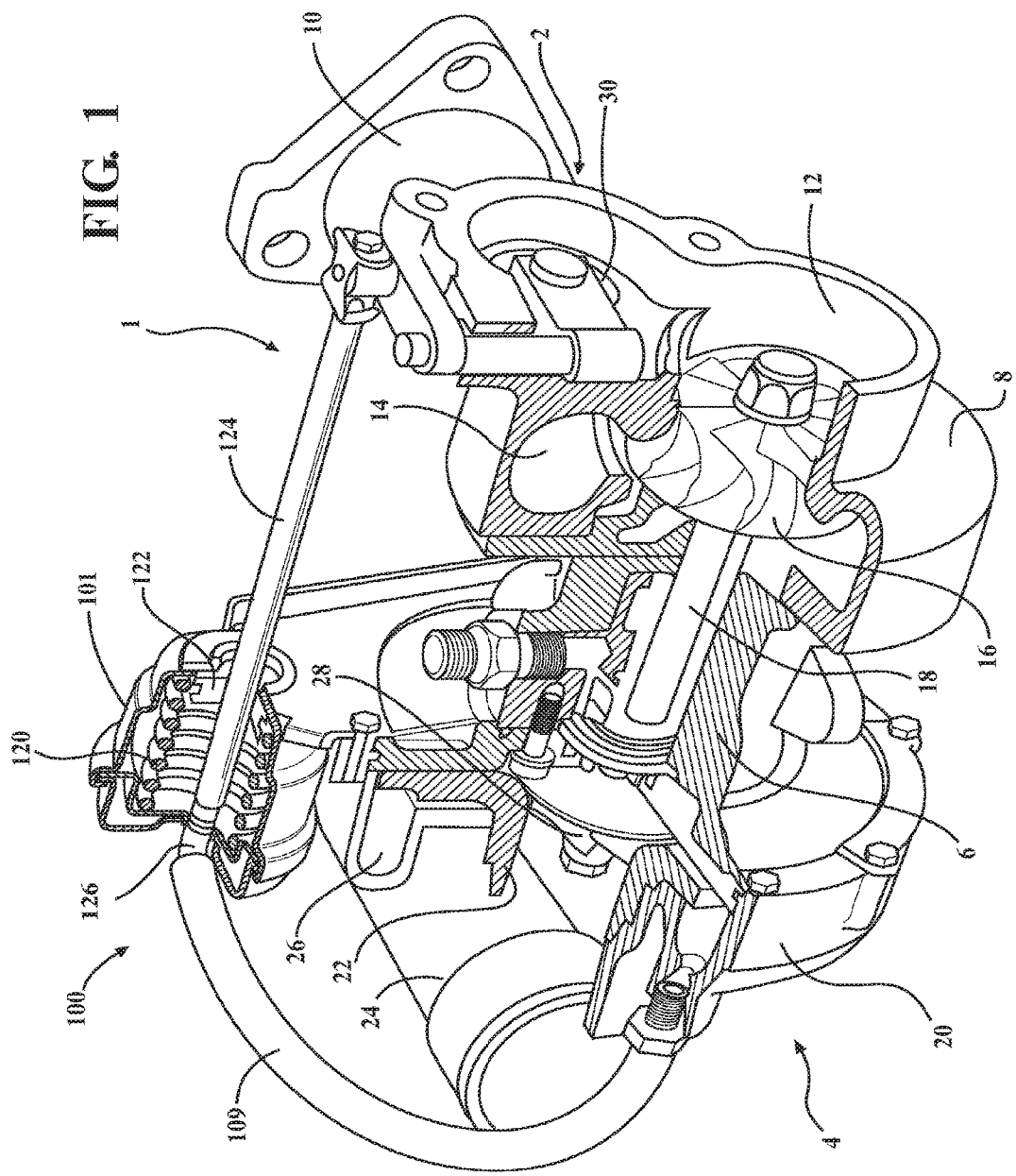
FIG. 1 is a partially-sectioned perspective view of an exhaust gas turbocharger including a wastegate valve connected to a pneumatic actuator.

Referring to FIG. 1, an exhaust gas turbocharger 1 includes a turbine section 2, a compressor section 4, and a bearing housing 6 disposed between and connecting the compressor section 4 to the turbine section 2. The turbine section 2 includes a turbine housing 8 that defines an exhaust gas inlet 10, an exhaust gas outlet 12, and a turbine volute 14 disposed in the fluid path between the exhaust gas inlet 10 and the exhaust gas outlet 12. A turbine wheel 16 is disposed in the turbine housing 8 between the turbine volute 14 and the exhaust gas outlet 12. A shaft 18 is connected to the turbine wheel 16, is rotatably supported within in the bearing housing 6, and extends into the compressor section 4. The compressor section 4 includes a compressor housing 20 that defines an air inlet 22, an air outlet 24, and a compressor volute 26. A compressor wheel 28 is disposed in the compressor housing 20 between the air inlet 22 and the compressor volute 26. The compressor wheel 28 is connected to, and driven by, the shaft 18.

In use, the turbine wheel 16 is rotatably driven by an inflow of exhaust gas supplied from the exhaust manifold of an engine (not shown). Since the shaft 18 connects the turbine wheel 16 to the compressor wheel 28, the rotation of the turbine wheel 16 causes rotation of the compressor wheel 28. As the compressor wheel 28 rotates, it provides a pressure boost to the engine by increasing the air mass flow rate, airflow density and air pressure delivered to the engine's cylinders via an outflow from the compressor air outlet 24, which is connected to the engine's air intake manifold.

When the pressure of the exhaust gas is high, there may be more exhaust pressure than is required to provide the desired pressure boost. One solution for this problem is to divert exhaust gas away from the turbine wheel 16 during high exhaust gas pressure conditions, so that the amount of exhaust gas reaching the turbine wheel 16 is the quantity needed to provide optimum pressure boost. A wastegate valve 30 is used to divert exhaust gases away from the turbine wheel 16. Diversion of exhaust gases controls the turbine wheel rotational speed, which in turn controls the rotational speed of the compressor wheel 28. By controlling the rotational speed of the compressor wheel 28, the wastegate valve 30 is able to regulate the maximum boost pressure provided to the engine by the turbocharger 1.

The wastegate valve 30 is disposed on the turbine housing 8 upstream of the turbine wheel 16, and is actuated by a pneumatic actuator 100 that uses the turbocharger 1 as a source of pressurized fluid. For example, a portion of the pressurized air from the compressor section 4 is conducted to an air inlet 126 of the pneumatic actuator 100 via a line 109. When the compressor output pressure is high, the pneumatic actuator 100 opens the wastegate valve 30.

Figure 2:
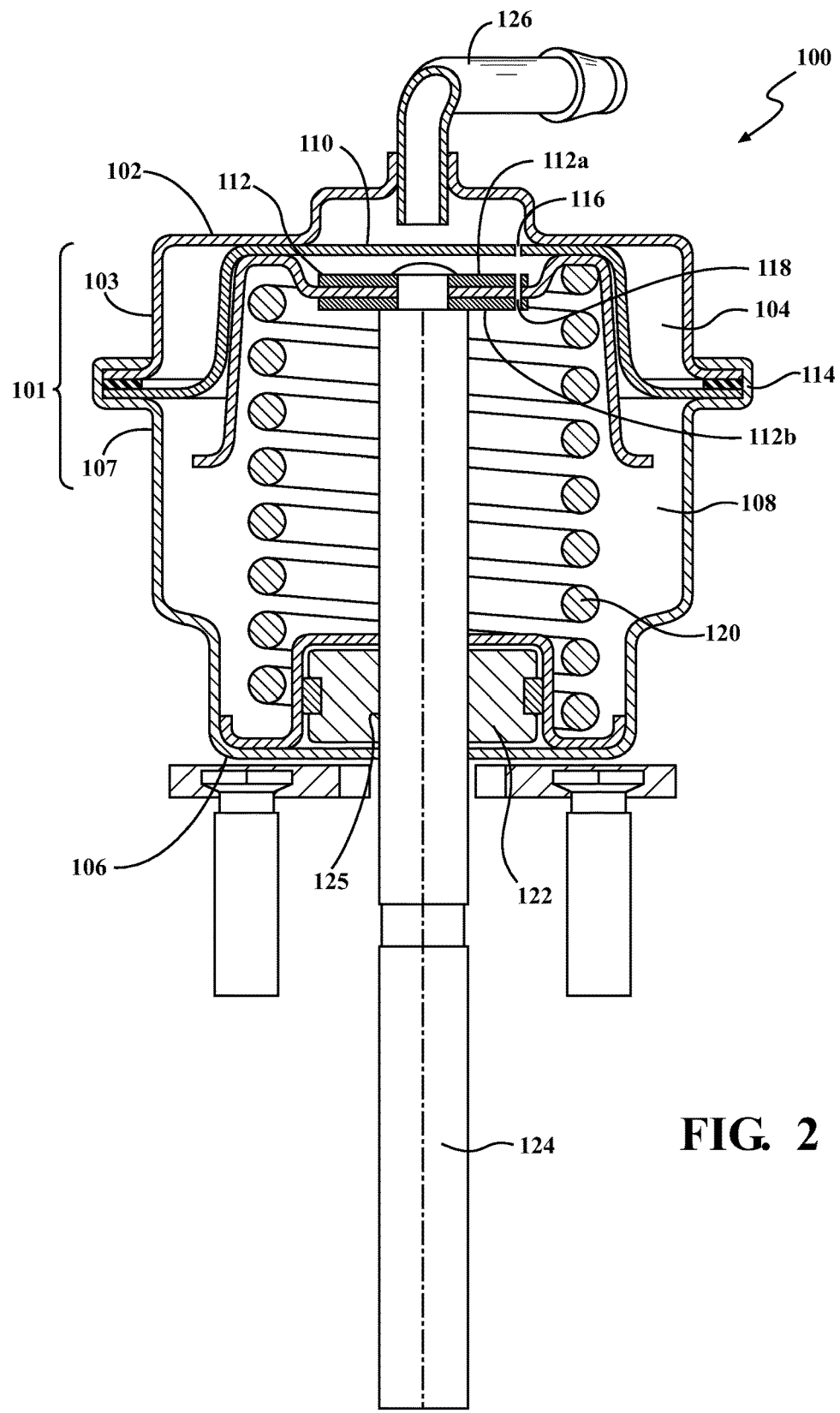
FIG. 2 is a cross-sectional view of the pneumatic actuator of FIG. 1, illustrating a single small orifice formed in each of the piston and the diaphragm.

Referring to FIG. 2, the pneumatic actuator 100 has housing 101 that includes a first portion 103 at a first end 102 thereof, and a second portion 107 at a second end 106 thereof. The first portion 103 and the second portion 107 are held together by a crimp 114 in the housing 101. The pneumatic actuator 100 includes a flexible, gas-impermeable diaphragm 110 disposed in the housing in a manner such that the peripheral edge of the diaphragm 110 is also held by the crimp 114. A first compartment 104 is defined between the housing first portion 103 and the diaphragm 110, and a second compartment 108 is defined between the housing second portion 107 and the diaphragm 110.

The diaphragm 110 is connected to a piston 112 that resides in the second compartment 108. The piston 112 is urged toward the housing first end 102 via a spring 120 that extends between the piston 112 and the housing second end 106. The piston 112 is connected to the wastegate valve 30 by a rod 124 that extends out of the second portion 107 of the housing 101 through a bushing 122.

The pneumatic actuator 100 is single-acting, e.g., the piston 112 is advanced using pressurized fluid applied to one side 112a of the piston (e.g., via the diaphragm 110), and the piston 112 is returned to a retracted position by the spring 120 which acts on the opposed side 112b of the piston. This can be compared to a double-acting pneumatic actuator (not shown) in which a piston is advanced using pressurized fluid applied to one side of the piston, and is retracted using pressurized fluid applied to the opposed side of the piston (e.g., the spring is omitted).

The first portion 103 includes the pressurized air inlet 126, through which the first compartment 104 receives pressurized air from the compressor via the line 109. Thus, the first compartment 104 includes air at a positive pressure, which is defined as being at a pressure greater than atmospheric pressure. The second compartment 108 is nominally pressurized, as discussed in detail below, and thus is substantially at atmospheric pressure. The pressurized air in the first compartment 104 acts on the piston 112, and when it has sufficient pressure, the air pushes the piston 112 against the force of the spring 120 toward the housing second end 106. Due to its connection to the wastegate valve 30 via the rod 124, movement of the piston 112 toward the housing second end 106 results in movement of the wastegate valve 30 from a closed position to an open position. When the first compartment 104 is not at the sufficient pressure, the piston 112 is retracted toward the first end 102 due to the resilient properties of the spring 120. As the piston 112 moves toward the housing first end 102, the wastegate valve 30 moves from the open position to a closed position.

The pneumatic actuator 100 is configured to minimize or eliminate entry of water and debris into the housing 101. In particular, the diaphragm 110 includes a diaphragm orifice 116, and the piston 112 includes a piston orifice 118. The diaphragm orifice 116 and the piston orifice 118 cooperate to permit fluid communication between the first compartment 104 and the second compartment 108. For example, pressurized air flows from the first compartment 104 into the second compartment 108 through the diaphragm orifice 116 and the piston orifice 118 to provide nominal pressurization of the second compartment 108. The diaphragm orifice 116 and the piston orifice 118 are relatively small openings, such that the amount of air admitted is sufficient to allow for air to flow through of the second compartment 108, and prevent the inflow of air into of the second compartment 108 through the clearance space 125 between the bushing 122 surrounding the shaft 124 and an outer surface of the shaft 124.

However, the amount of air admitted through the orifices 116, 118 is not large enough to raise the air pressure in of the second compartment 108 to a level that prevents the air in the first compartment 104 from moving the piston 112 in response to the admission of pressurized air through the air inlet 126.

The second compartment 108 is vented to the atmosphere through the clearance space 125. The clearance is small, and in practice a slight (e.g., nominal) positive pressure builds up in the second compartment 108. By admitting the small amount of pressurized air into the second compartment 108 via the orifices 116, 118, the amount of water and debris entering the second compartment 108 is reduced or eliminated.

In normal flow, the air flow through an orifice is proportional to the area of the orifice and thus it is proportional to the square of the diameter of the orifice. In general, the flow through an orifice is proportional to the square root of the pressure difference across the orifice. However, in order to avoid over-pressurizing the second compartment 108, it is preferred that the orifices 116, 118 are small and operate in a choked flow mode. In choked flow, at low pressure differences across the orifice, the gas flow is roughly proportional to the area of the orifice, or the square of the diameter of the orifice. This is shown in Table 1. However, in choked flow, the flow through an orifice is not proportional to the square root of the pressure difference. Instead, as the pressure difference across the orifice increases, the increase in flow is smaller than would be expected.

In order to keep the air flow from the pressurized first compartment 104 to the second compartment 108 in the correct range, the diaphragm orifice 116 and the piston orifice 118 are rather small. Circular orifices between 0.25 mm to 2.0 mm in diameter have been found to be appropriate. Such orifices have an opening area of 0.049 $mm^2$ to 3.154 $mm^2$. At pressure differences, across the orifice, of at least 5 PSIG, that is the pressure relative to atmospheric pressure, the volume of air flowing through an orifice 0.25 mm to 2.0 mm in diameter is choked. At pressure differences less than 20 PSIG, the flow through the orifice increases as the pressure difference gets larger, although not as much as expected. However, when the pressure difference across the orifice is greater than 20 PSIG, there is little increase in the volume of gas flowing through the orifice. In a pneumatic actuator having such an orifice, the air flow the from the first compartment 104 to the second compartment 108 does not increase as the pressure difference between first compartment 104 and the second compartment 108 goes above 20 PSIG. Table 1 shows the calculated flow volumes in $mm^3$ (cubic millimeters) flowing through a circular orifices of different sizes and various pressure differences in PSIG. These flows are at room temperature, which is maintained constant.

TABLE 1

| Orifice Diameter | Pressurized Portion Pressure in PSIG | | | | | |
|---|---|---|---|---|---|---|
| in mm | 5 | 10 | 20 | 30 | 40 | 50 |
| 0.25 | 10,582 | 13,867 | 15,248 | 15,248 | 15,248 | 15,248 |
| 0.5 | 42,327 | 55,467 | 60,994 | 60,994 | 60,994 | 60,994 |
| 1.0 | 169,309 | 221,868 | 243,974 | 243,974 | 243,974 | 243,974 |
| 1.5 | 380,946 | 499,202 | 548,942 | 548,942 | 548,942 | 548,942 |
| 2.0 | 677,237 | 887,471 | 975,897 | 975,897 | 975,897 | 975,897 |
| | | | Flow Volume in $mm^3$ | | | |

The single-acting pneumatic actuator 100 can be compared to some conventional single-acting pneumatic actuators that do not include diaphragm openings 116 and piston openings 118. In such conventional pneumatic actuators, air from the atmosphere is drawn into the first compartment when the piston is retracted toward the second end. In these conventional devices, as air enters the first compartment, water and debris may also enter into the first compartment.

The water and debris can interfere with the operation of the piston, and can lead to corrosion and abrasion. Advantageously, by providing the pneumatic actuator 100 that includes the diaphragm openings 116 and piston openings 118, air flow into the second compartment 108 through the clearance space 125 is reduced or eliminated, whereby ingress of foreign matter such as water and debris into the housing 101 is reduced or eliminated.

Figure 3:
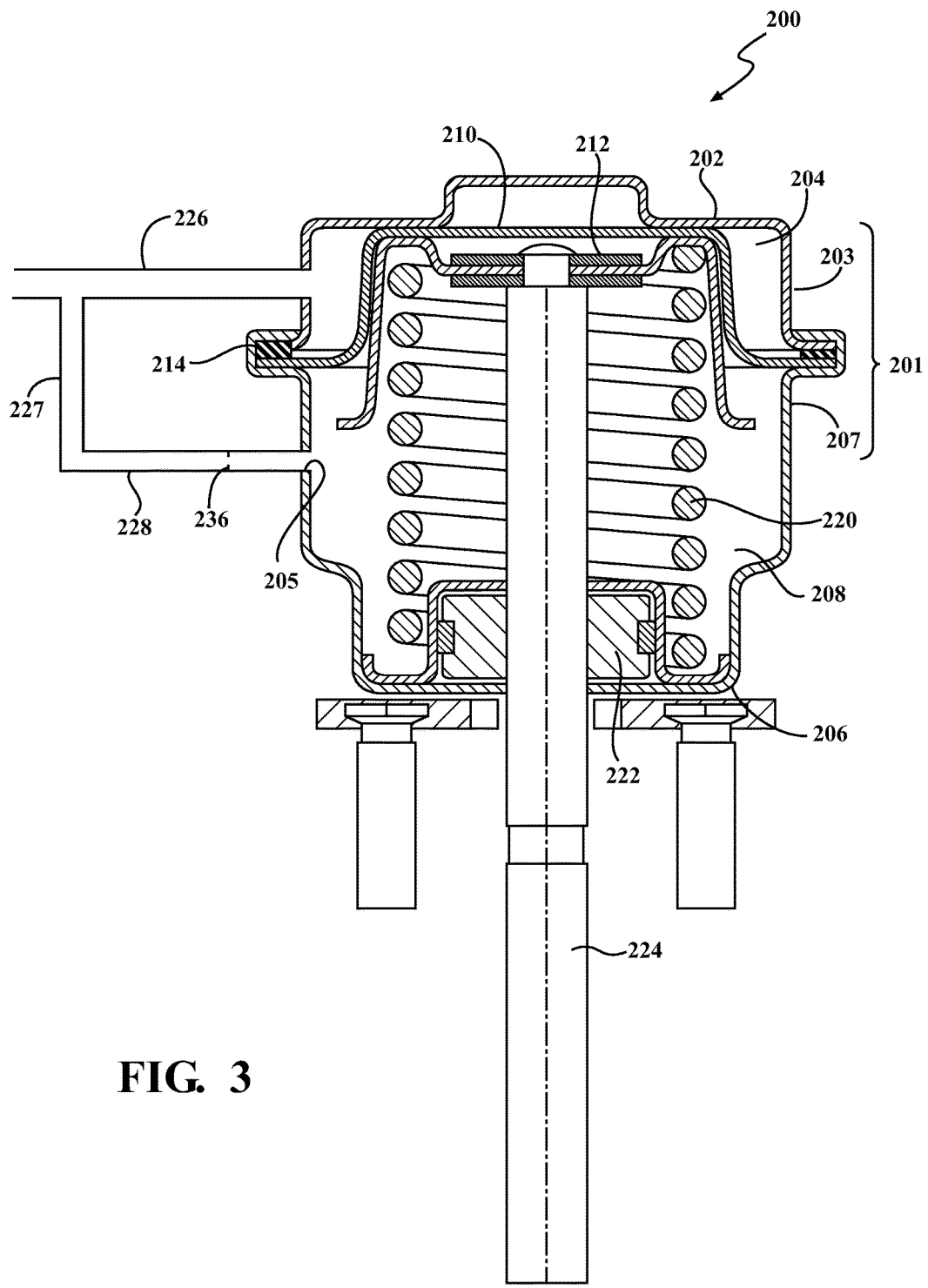
FIG. 3 is a cross-sectional view of another embodiment pneumatic actuator in which the air inlet tube from the first compartment is connected to the second compartment by a fluid line.

Referring to FIG. 3, another embodiment single-acting pneumatic actuator 200 includes a housing 201 having a first portion 203 at a first end 202 thereof, and a second portion 207 at a second end 206 thereof. The first portion 203 and the second portion 207 are held together by a crimp 214 in the housing 201. The pneumatic actuator 200 includes a flexible, gas-impermeable diaphragm 210 disposed in the housing in a manner such that the peripheral edge of the diaphragm 210 is also held by the crimp 214. A first compartment 204 is defined between the housing first portion 203 and the diaphragm 210, and a second compartment 208 is defined between the housing second portion 207 and the diaphragm 210.

The diaphragm 210 is connected to a piston 212 that resides in the second compartment 208. The piston 212 is urged toward the housing first end 202 via a spring 220 that extends between the piston 212 and the housing second end 206. The piston 212 is connected to the wastegate valve 30 by a rod 224 that extends out of the second portion 207 of the housing 201 through a bushing 222.

Pressurized air is admitted to the first compartment 204 through a first air inlet tube 226. In addition, pressurized air is admitted to the second compartment 208 through a second inlet tube 228. The second inlet tube 228 connects to an opening 205 in the second portion 207 of the housing 201 at a location spaced apart from the diaphragm 210. A fluid line 227 connects the first inlet tube 226 to the second inlet tube 228. The fluid line 227 has a relatively small internal diameter, for example in a range of 0.25 mm to 2.0 mm. However, in some applications, it may be more convenient to use an ordinary diameter pipe or hose and include a flow restrictor 236 such as an orifice plate with an orifice 0.25 mm to 2.0 mm in diameter within the pipe or hose.

The air flowing through the fluid line 227 is choked, and accordingly, beyond a certain point, increases in the air pressure difference between the first compartment 204 and the second compartment 208 do not lead to increases in air flow through the fluid line 227, as previously discussed. The second compartment 208 is vented to the atmosphere through the clearance space between the bushing 222 surrounding the shaft 224 and an outer surface of the shaft 224.

The clearance is small, and in practice a slight (e.g., nominal) positive pressure builds up in the second compartment 208. As discussed with respect to the previous embodiment, by admitting the small amount of pressurized air into the second compartment 208 via the second inlet tube 228, the amount of water and debris entering the second compartment 208 is reduced or eliminated.

Figure 4:
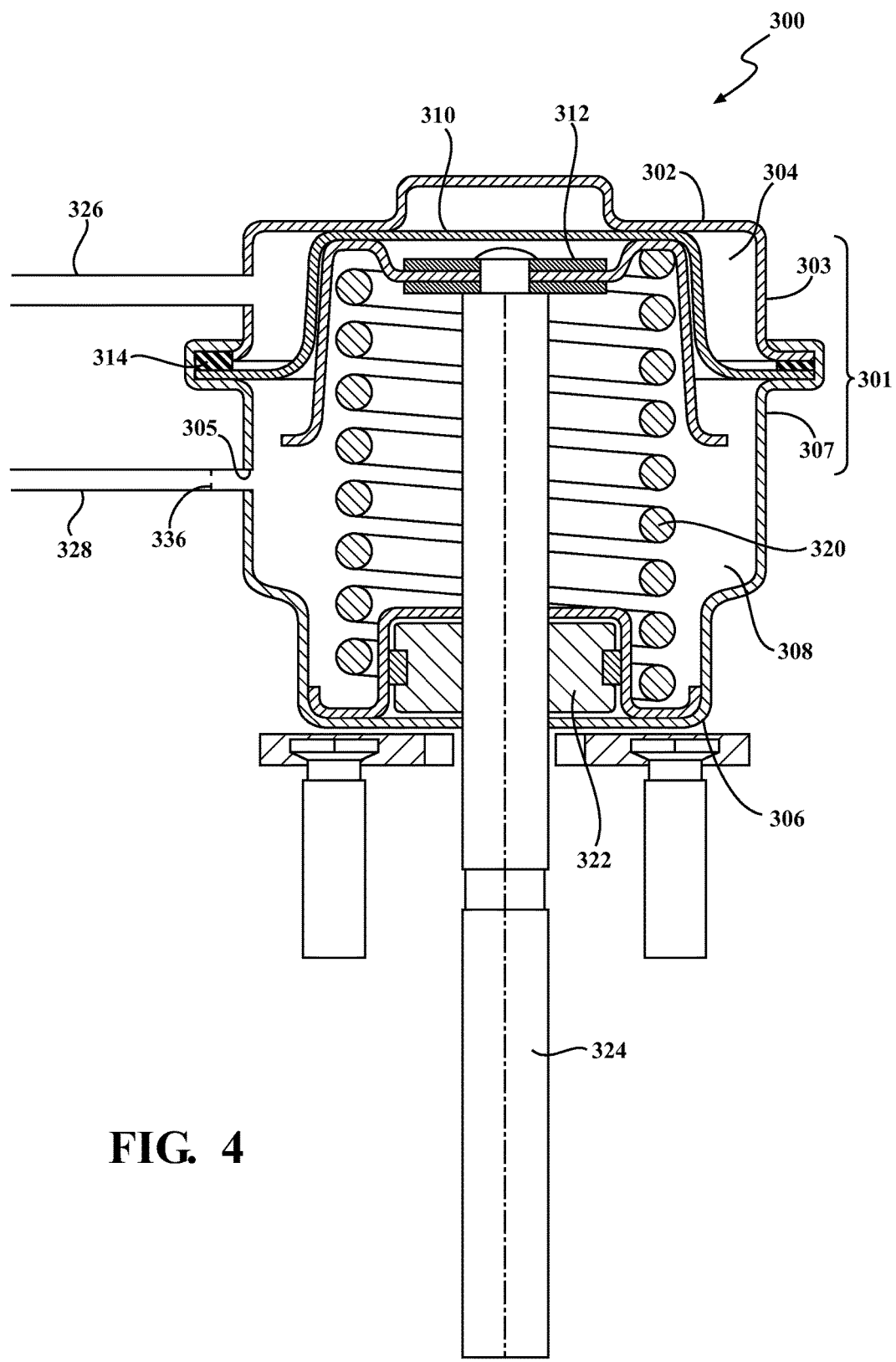
FIG. 4 is a cross-sectional view of another embodiment pneumatic actuator including a separate air inlet tube for each of the first compartment and the second compartment.

Referring to FIG. 4, another embodiment single-acting pneumatic actuator 300 includes a housing 301 having a first portion 303 at a first end 302 thereof, and a second portion 307 at a second end 306 thereof. The first portion 303 and the second portion 307 are held together by a crimp 314 in the housing 301. The pneumatic actuator 300 includes a flexible, gas-impermeable diaphragm 310 disposed in the housing in a manner such that the peripheral edge of the diaphragm 310 is also held by the crimp 314. A first compartment 304 is defined between the housing first portion 303 and the diaphragm 310, and a second compartment 308 is defined between the housing second portion 307 and the diaphragm 310.

The diaphragm 310 is connected to a piston 312 that resides in the second compartment 308. The piston 312 is urged toward the housing first end 302 via a spring 320 that extends between the piston 312 and the housing second end 306. The piston 312 is connected to the wastegate valve 30 by a rod 324 that extends out of the second portion 307 of the housing 301 through a bushing 322.

Pressurized air is admitted to the first compartment 304 through a first air inlet tube 326. In addition, pressurized air is admitted to the second compartment 308 through a second inlet tube 328. The second inlet tube 328 connects to an opening 305 in the second portion 307 of the housing 301 at a location spaced apart from the diaphragm 310. Unlike the pneumatic actuator 200 shown in FIG. 3, the first air inlet tube 326 and second air inlet tube 328 are not connected, and instead are independent of each other. The amount of air admitted to the second compartment 308 is controlled by the size of the second inlet tube 328, or alternatively, by placing the flow restrictor 336 in the second inlet tube 328 (FIG. 4). The flow restrictor 336 may be an orifice plate having an orifice with a diameter that is between 0.25 mm to 2.0 mm. The source of pressurized air admitted to the second compartment 308 may be the same source that provides pressurized air to the first compartment 304. The second compartment 308 is vented to the atmosphere through the clearance space between the bushing 322 surrounding the shaft 324 and an outer surface of the shaft 324. The clearance is small, and in practice a slight (e.g., nominal) positive pressure builds up in the first portion 308. As discussed with respect to the previous embodiments, by admitting the small amount of pressurized air into the second compartment 308 via the second inlet tube 328, the amount of water and debris entering the second compartment 308 is reduced or eliminated.

Figure 5:
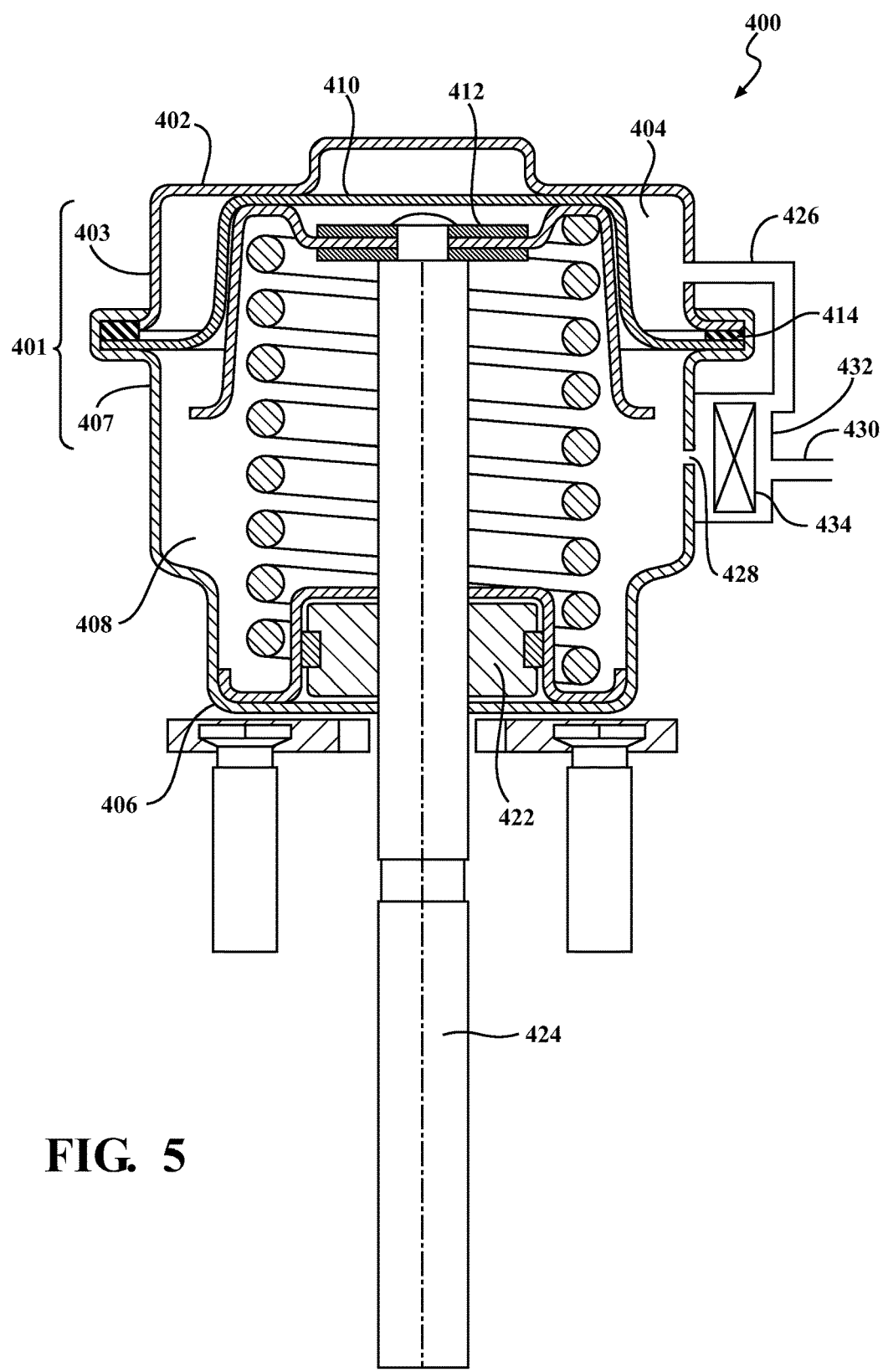
FIG. 5 is a cross-sectional view of another embodiment pneumatic actuator in which a solenoid operated valve connects the first compartment and the second compartment.

Referring to FIG. 5, another embodiment single-acting pneumatic actuator 400 includes a housing 401 having a first portion 403 at a first end 402 thereof, and a second portion 407 at a second end 406 thereof. The first portion 403 and the second portion 407 are held together by a crimp 414 in the housing 401. The pneumatic actuator 400 includes a flexible, gas-impermeable diaphragm 410 disposed in the housing in a manner such that the peripheral edge of the diaphragm 410 is also held by the crimp 414. A first compartment 404 is defined between the housing first portion 403 and the diaphragm 410, and a second compartment 408 is defined between the housing second portion 407 and the diaphragm 410.

The diaphragm 410 is connected to a piston 412 that resides in the second compartment 408. The piston 412 is urged toward the housing first end 402 via a spring 420 that extends between the piston 412 and the housing second end 406. The piston 412 is connected to the wastegate valve 30 by a rod 424 that extends out of the second portion 407 of the housing 401 through a bushing 422.

The pneumatic actuator 400 includes a solenoid operated valve 434 disposed in a housing 432 that is supported on the pneumatic actuator housing 401. Pressurized air is admitted to solenoid operated valve 434 through a first air inlet tube 430. A second air inlet tube 426 conducts air from the solenoid operated valve 434 to the first compartment 404. The solenoid operated valve 434 can admit air to an air inlet 428 of the second compartment 408. The air inlet 428 is opening in the second portion 407 of the housing 401 at a location spaced apart from the diaphragm 410. When activated, the solenoid operated valve 434 directs air from the first compartment 404 to the second compartment 408.

Thus, the first compartment 404 and the second compartment 408 are connected to each other by the solenoid operated valve 434. At times where less activation of the pneumatic actuator 400 is required, the solenoid operated valve 434 opens and bleeds air to the second compartment 408. This provides occasional bursts of air to the second compartment 408 to drive out debris and moisture. In the illustrated embodiment, pressurized air is admitted to the solenoid operated valve 434 through the first inlet tube 430, and the second air inlet tube 426 conducts pressurized air from the solenoid operated valve 434 the first compartment 404. Alternatively, pressurized air could be directly admitted to the first compartment 404 and the solenoid operated valve 434 would simply conduct pressurized air from the first compartment 404 to the second compartment 408. The electrical signal to operate the solenoid operated valve 434 can come from a turbocharger controller or from the engine electronic control unit.

Figure 6:
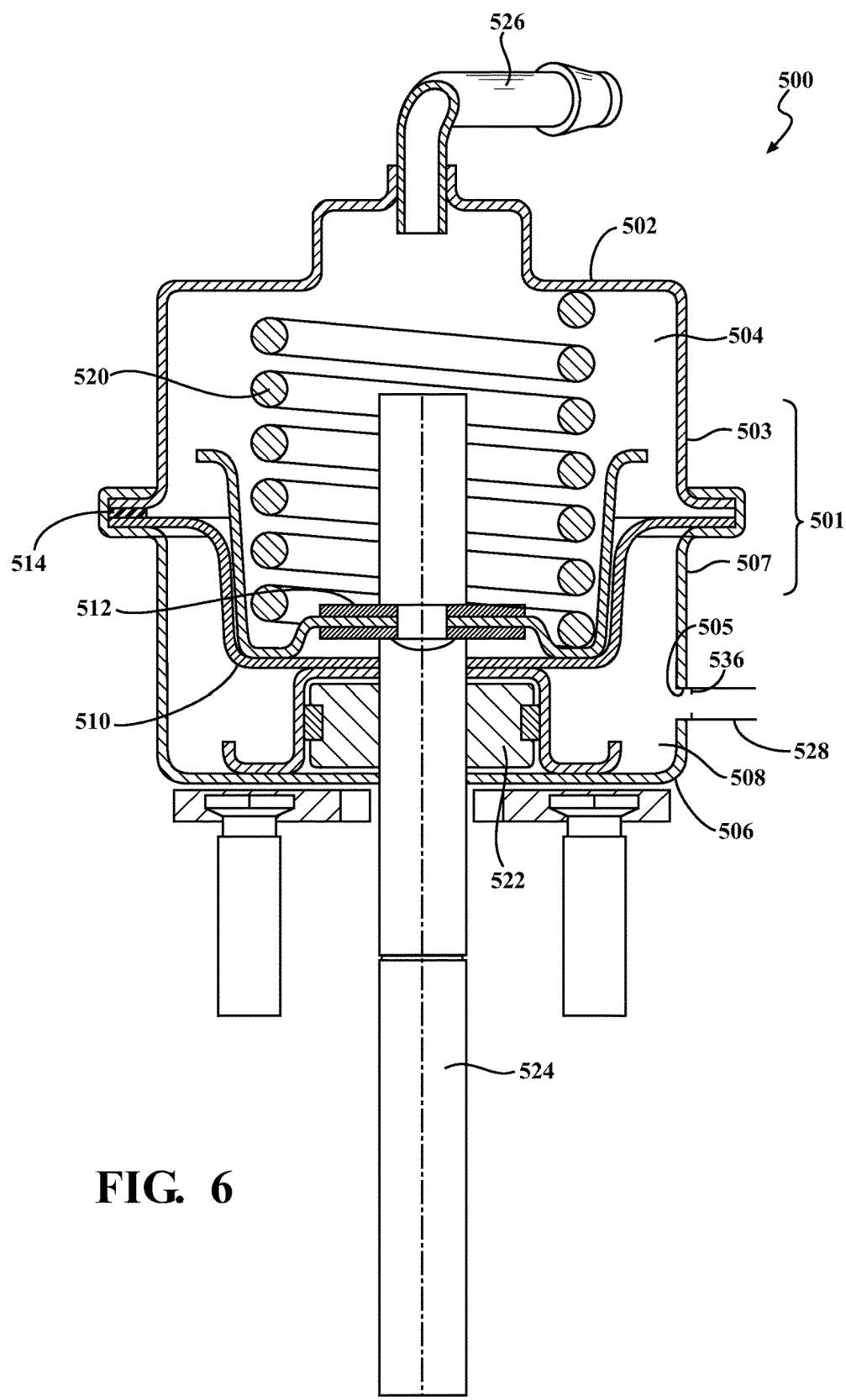
FIG. 6 is a cross-sectional view of another embodiment pneumatic actuator including a vacuum-actuated piston.

Referring to FIG. 6, another embodiment single-acting pneumatic actuator 500 includes a housing 501 that is divided into a first portion 503 at a first end 502 thereof, and a second portion 507 at a second end 506 thereof. The first portion 503 and the second portion 507 are held together by a crimp 514 in the housing 501. The pneumatic actuator 500 includes a flexible, gas-impermeable diaphragm 510 disposed in the housing in a manner such that the peripheral edge of the diaphragm 510 is also held by the crimp 514. A first compartment 504 is defined between the housing first portion 503 and the diaphragm 510, and a second compartment 508 is defined between the housing second portion 507 and the diaphragm 510.

The diaphragm 510 is connected to a piston 512 that resides in the first compartment 504. The piston 512 is urged toward the housing second end 506 via a spring 520 that extends between the piston 512 and the housing first end 502. The piston 512 is connected to the wastegate valve 30 by a rod 524 that extends out of the second portion 507 of the housing 501 through a bushing 522.

A vacuum is applied to the first compartment 504 via a first tube 526, and is used to control the position of the piston 512 relative to the housing 501, and thus the position of the wastegate valve 30. Thus, the first compartment 504 includes air at a negative pressure, which is defined as being at a pressure less than atmospheric pressure. The second compartment 508 is nominally pressurized, and thus is substantially at atmospheric pressure. For example, a small (e.g. nominal) amount of pressurized (e.g., positive pressure) air is admitted to the second compartment 508 through a second tube 528. The second inlet tube 528 connects to an opening 505 in the second portion 507 of the housing 501 at a location spaced apart from the diaphragm 510.

The amount of positively-pressured air admitted to the second compartment 508 is controlled by the size of the second tube 528 or, alternatively, by placing a flow restrictor 536 in the second tube 528 (FIG. 5). The flow restrictor 536 may be an orifice plate having an orifice that has a diameter of 0.25 mm to 2 mm. The turbocharger 1 or other convenient source of pressurized air may be the source providing pressurized air to the second tube 528. The second compartment 508 is vented to the atmosphere through the clearance space between the bushing 522 surrounding the shaft 524 and an outer surface of the shaft 524. The clearance is small, and in practice a slight (e.g., nominal) positive pressure builds up in the second compartment 508.

As discussed with respect to the previous embodiments, by admitting the small (e.g., nominal) amount of pressurized air into the second compartment 508 via the second tube 528, the amount of water and debris entering the second compartment 508 is reduced or eliminated.

Figure 7:
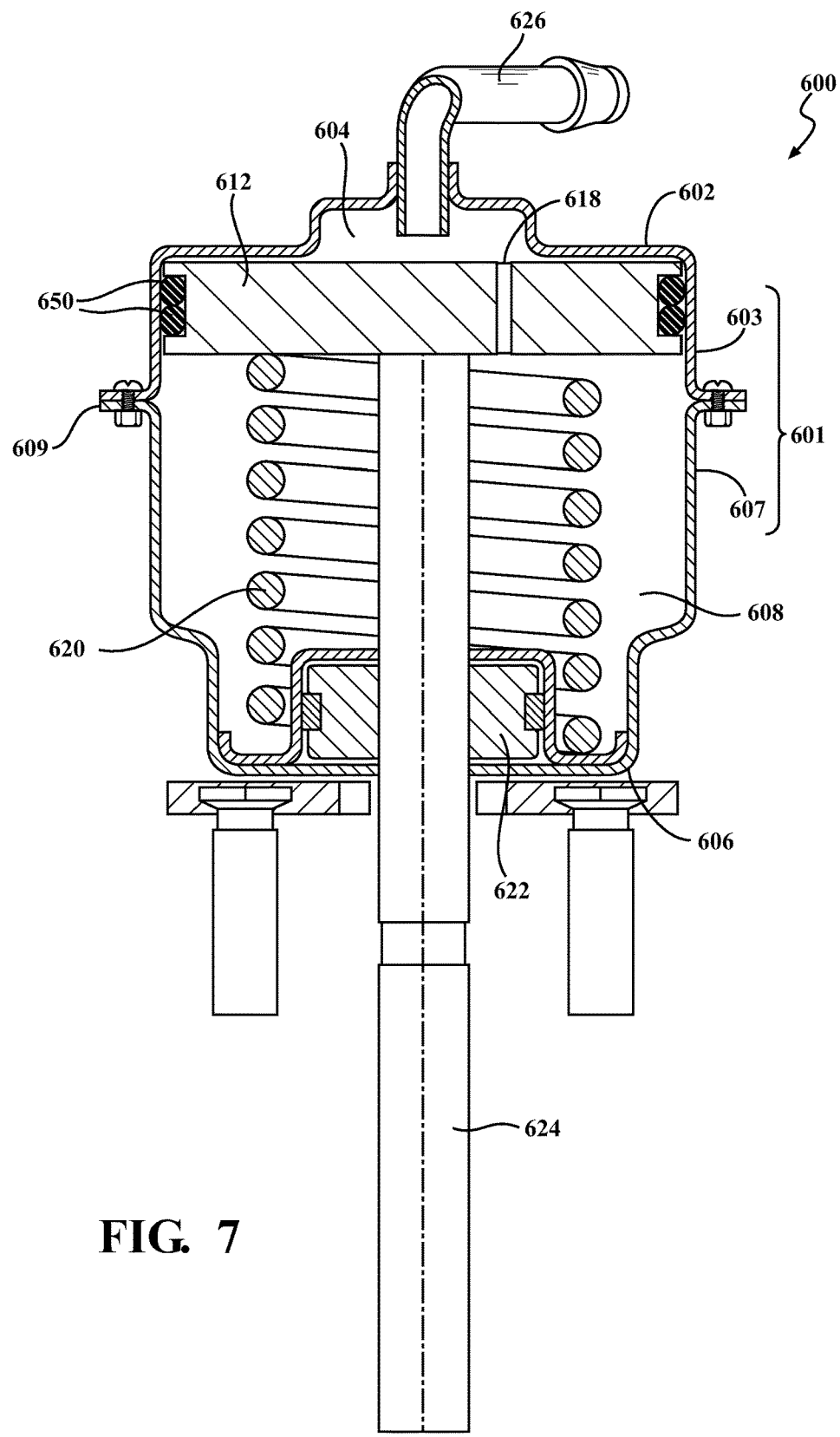
FIG. 7 is a cross-sectional view of another embodiment pneumatic actuator including an O-ring-sealed piston.

Referring to FIG. 7, another embodiment single-acting pneumatic actuator 600 includes a housing 601 that is divided into a first portion 603 at a first end 602 thereof, and a second portion 607 at a second end 606 thereof. The first portion 603 and the second portion 607 are held together along a flange 609 by fasteners. A piston 612 is disposed in the housing 601 so as to slide between the first end 602 and the second end 606. A first compartment 604 is defined between the housing first portion 603 and the piston 612, and a second compartment 608 is defined between the housing second portion 607 and the piston 612.

The piston 612 includes two O-rings 650 that extend around the circumference of the piston 612. The O-rings 650 provide a fluid-impermeable seal between an outer periphery of the piston 612 and an inner surface of the housing 601. The piston 612 is urged toward the housing first end 602 by a spring 620 that extends between the piston 612 and the housing second end 606. The piston 612 is connected to the wastegate valve 30 by a rod 624 that extends out of the second portion 607 of the housing 601 through a bushing 622. The housing first portion 603 includes an air inlet 626, and pressurized air (e.g., air at a positive pressure) enters the first compartment 604 through the air inlet 626.

The piston 612 includes a piston orifice 618. In particular, the piston orifice 618 is positioned at a location spaced from the piston outer periphery, and thus does negatively affect the seal provided by the O-rings 650. The piston orifice 618 provides fluid communication between the first compartment 604 and the second compartment 608. For example, pressurized air flows from the first compartment 604 into the second compartment 608 through the piston orifice 618. The piston orifice 618 is dimensioned to provide a relatively small opening, such that the amount of air admitted is sufficient to allow for air to flow through the second compartment 608, but not large enough to raise the air pressure in the second compartment 608 to a level that prevents the air in the first compartment 604 from moving the piston 612 in response to the admission of pressurized air to the first compartment 604. For example, the piston orifice 618 has a diameter in a range between 0.25 mm to 2 mm. The quantity of air which bleeds from the first compartment 604 to the second compartment 608 through the orifice 618 is small and thus the high pressure in the first compartment 604 of the pneumatic actuator 600 is not substantially decreased. The second compartment 608 is vented to the atmosphere through the clearance space between the bushing 622 surrounding the shaft 624 and an outer surface of the shaft 624. A slight (e.g., nominal) positive pressure may build up in the second compartment 608, but by controlling the orifice size the nominal positive pressure will not interfere with the operation of the pneumatic actuator 600. Accordingly, the pneumatic actuator 600 will operate normally in the presence of the piston orifice 618. As discussed with respect to the previous embodiments, by admitting the small amount of pressurized air into the second compartment 608 via the piston orifice 618, the amount of water and debris entering the second compartment 608 is reduced or eliminated.

Although the pneumatic actuator 600 is described as having two O-rings 650, it is understood that one O-ring 650, or more than two O-rings 650, can be employed to seal the piston 612 relative to the housing 601.

Figure 8:
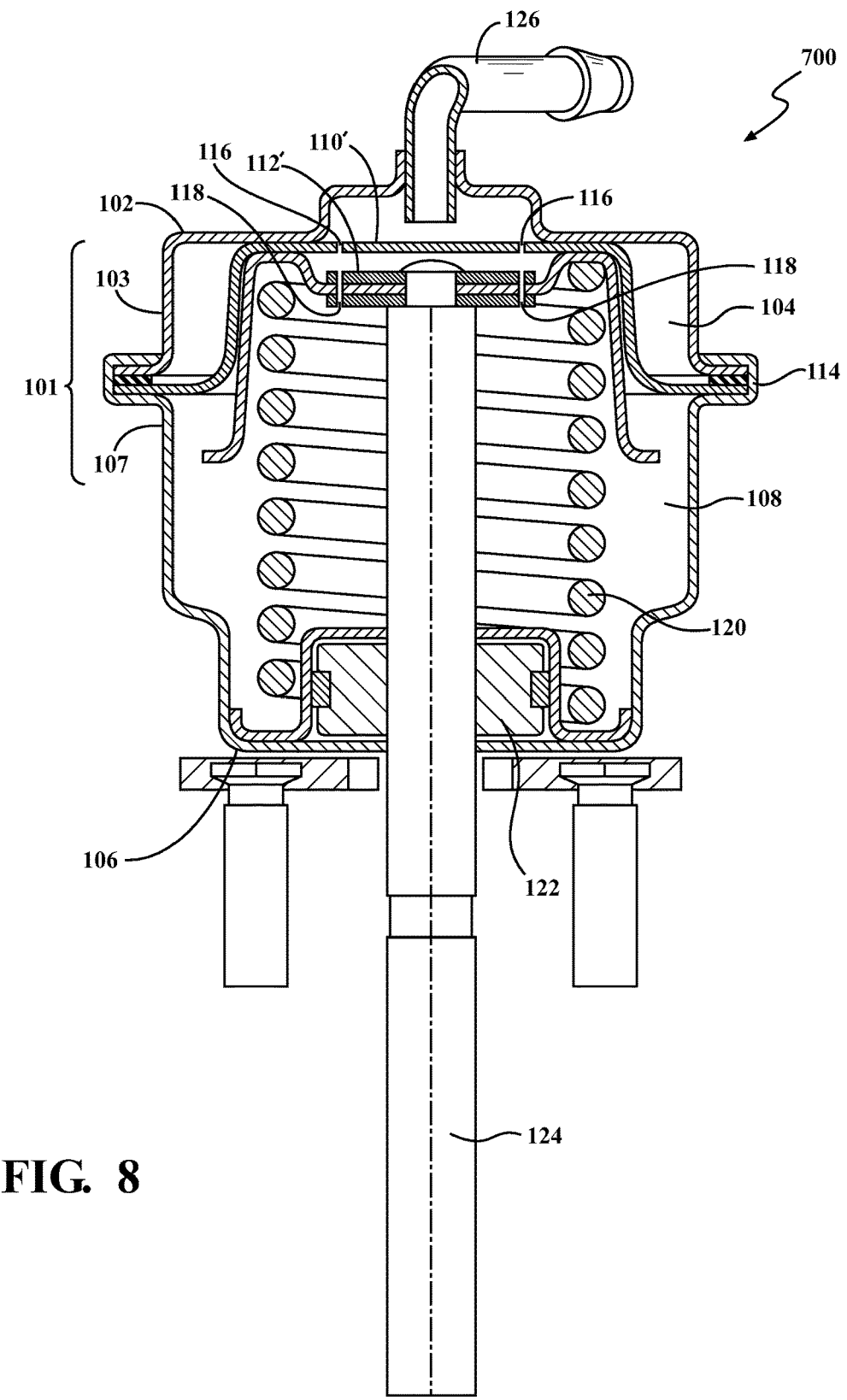
FIG. 8 is a cross-sectional view of another embodiment pneumatic actuator in which the piston and diaphragm each have two small orifices.

Referring to FIG. 8, although the pneumatic actuators 100, 600 are described herein as including a single orifice (e.g., a single diaphragm orifice 116 and a single piston orifice 118 for the pneumatic actuator 100, and a single piston orifice 618 for the pneumatic actuator 600), the pneumatic actuators 100, 600 are not limited to having a single orifice. For example, another single-acting pneumatic actuator 700 includes a diaphragm 110' having two diaphragm orifices 116, and a piston 112' having two piston orifices 118. The pneumatic actuator 700 is otherwise similar in form and function to the pneumatic actuator 100, and like reference numbers are used to refer to like parts.

The diaphragm orifices 116 and the piston orifices 118 have a total opening area of 0.049 $mm^2$ to 3.154 $mm^2$. However, the diaphragm 110 and/or the piston 112, 612 may include more than two orifices 116, 118, 618, and the orifice shapes are not limited to a circular shape, provided that the total opening area of the orifices 116, 118, 618 is between 0.049 mm² to 3.154 mm².

Pressurized air enters the first compartment 104 through the air inlet 126. The pressurized air flows into the second compartment 108 through the diaphragm orifices 116 and the piston orifices 118. The quantity of air which bleeds from the first compartment 104 to the second compartment 108 through the diaphragm orifices 116 and the piston orifices 118 is small and thus the high pressure in the first compartment 104 of the pneumatic actuator 700 is not substantially decreased. A slight positive pressure may build up in the second compartment 108, but by controlling the size of the diaphragm orifices 116 and the piston orifices 118, the air admitted to the second compartment 108 will not interfere with the operation of the pneumatic actuator 700. Accordingly, the pneumatic actuator 700 will operate normally in the presence of the diaphragm orifices 116 and the piston orifices 118. As discussed with respect to the previous embodiments, by admitting the small amount of pressurized air into the second compartment via diaphragm orifices 116 and the piston orifices 118, the amount of water and debris entering the second compartment 108 is reduced or eliminated.

The embodiments described herein include orifices 116, 118, 618 and or second inlet tubes 228, 328, 428, 528 having a suggested dimension and/or a range of dimensions. It is understood that the dimensions of these orifices and inlets may be decreased to improve actuator reaction timing, or increased to provide additional corrosion resistance.

A selected illustrative embodiment of the invention is described above in some detail. It should be understood that only structures considered necessary for clarifying the present invention have been described herein. Other conventional structures, and those of ancillary and auxiliary components of the system, are assumed to be known and understood by those skilled in the art. Moreover, while a working example of the present invention has been described above, the present invention is not limited to the working example described above, but various design alterations may be carried out without departing from the present invention as set forth in the claims.

What is claimed:

1. A pneumatic actuator comprising:
   a housing including:
      a first portion,
      a first compartment that is defined in part by the first portion,
      a second portion, and
      a second compartment that is defined in part by the second portion and is separated from the first compartment by a separating member,
   a piston disposed in the housing, the piston defining at least a portion of the separating member,
   a spring disposed in the housing and extending between the piston and one of the first portion and the second portion,
   a first inlet that is in fluid communication with the first compartment, the first inlet configured to be connected to a non-zero-pressure fluid source, and
   a second inlet that is in fluid communication with the second compartment, the second inlet configured to be connected to a non-zero-pressure fluid source,
   wherein the separating member includes a diaphragm that is connected to the piston, and the second inlet comprises at least a first through opening in the diaphragm and a second through opening in the piston.

2. The pneumatic actuator of claim 1, further comprising the non-zero-pressure fluid source connected to the first inlet, wherein the non-zero-pressure fluid source is configured to provide fluid at a pressure greater than atmospheric pressure.

3. The pneumatic actuator of claim 1, further comprising the non-zero-pressure fluid source connected to the first inlet, wherein the non-zero-pressure fluid source is configured to provide fluid at a pressure less than atmospheric pressure.

4. The pneumatic actuator of claim 1, wherein the separating member includes an O-ring disposed about a circumference of the piston and providing a seal between the outer surface of the piston and an inner surface of the housing.

5. The pneumatic actuator of claim 1, wherein the second inlet comprises a single orifice in the diaphragm having a diameter between 0.25 mm and 2.0 mm and a single orifice in the piston having a diameter between 0.25 mm and 2.0 mm.

6. The pneumatic actuator of claim 1, wherein the second inlet comprises diaphragm orifices and piston orifices, and the total opening area of the orifices is in a range of 0.049 mm² to 3.154 mm².

7. The pneumatic actuator of claim 1, wherein the second inlet further comprises a third through opening in the diaphragm and a fourth through opening in the piston.

8. A turbocharger comprising:
   a compressor section including a compressor wheel,
   a turbine section including a turbine housing that surrounds a turbine wheel, the turbine wheel connected to the compressor wheel via a shaft,
   a wastegate valve supported on the turbine housing, and
   a pneumatic actuator configured to actuate the wastegate valve, the pneumatic actuator comprising:
      a housing including:
         a first portion,
         a first compartment that is defined in part by the first portion,
         a second portion, and
         a second compartment that is defined in part by the second portion and is separated from the first compartment by a separating member,
      a piston disposed in the housing and connected to the wastegate, the piston defining at least a portion of the separating member,
      a spring disposed in the housing and extending between the piston and one of the first portion and the second portion,
      a first inlet that is in fluid communication with the first compartment, the first inlet configured to be connected to a non-zero-pressure fluid source, and
      a second inlet that is in fluid communication with the second compartment, the second inlet configured to be connected to a non-zero-pressure fluid source,
         wherein the separating member includes a diaphragm that is connected to the piston, and the second inlet comprises at least a first through opening in the diaphragm and a second through opening in the piston.

* * * * *